(12) United States Patent
Chi et al.

(10) Patent No.: US 6,647,160 B1
(45) Date of Patent: Nov. 11, 2003

(54) FIBER BRAGG GRATING SENSOR SYSTEM

(75) Inventors: Sien Chi, Hsinchu (TW); Hong-Yih Tseng, Hsinchu (TW); Peng-Chun Peng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 42 days.

(21) Appl. No.: 10/171,663

(22) Filed: Jun. 17, 2002

(51) Int. Cl.$^7$ .................................................. G02B 6/00
(52) U.S. Cl. ............................. 385/12; 385/10; 385/15; 385/16; 385/24; 385/37
(58) Field of Search .............................. 385/10, 12, 15, 385/16, 24, 27, 31, 32, 37

(56) References Cited

U.S. PATENT DOCUMENTS

| | | | | |
|---|---|---|---|---|
| 5,680,489 A | * | 10/1997 | Kersey | 385/12 |
| 5,748,312 A | | 5/1998 | Kersey et al. | |
| 5,845,033 A | | 12/1998 | Berthold et al. | |
| 6,024,488 A | * | 2/2000 | Wu et al. | 374/161 |
| 6,072,567 A | | 6/2000 | Sapack | |
| 6,233,373 B1 | * | 5/2001 | Askins et al. | 385/12 |
| 6,278,810 B1 | * | 8/2001 | Sirkis et al. | 385/12 |
| 6,285,806 B1 | * | 9/2001 | Kersey et al. | 385/12 |
| 2002/0028034 A1 | * | 3/2002 | Chen et al. | 385/12 |
| 2002/0041722 A1 | * | 4/2002 | Johnson et al. | 385/12 |

OTHER PUBLICATIONS

T. Kurashima et al, "Distributed Strain Measurement Using BOTDR Improved by Taking Account of Temperature Dependence of Brillouin Scattering Power," NTT Access Network Systems Laboratories, *ECOC 97*, Sep. 22–25, 1997, Conference Publication No. 448, @IEE, 1997, p. 119.

Martin Putnam et al., "Sensor Grating Array Demodulation Using a Passively Mode–locked Fiber Laser,", U.S. Naval Research Laboratory, Washington, D.C., *Wednesday Afternoon*, OFC '97 Technical Digest, p. 156.

Gregg Johnson et al., "Fiber Bragg Grating Interrogation and Multiplexing with a 3×3 Coupler and a Scanning Filter," *Journal of Lightwave Technology*, vol. 18, No. 8, Aug. 2000, 2000 IEEE, p. 1101.

Y. Yu, et al., "Fiber–Laser–Based Wavelength–Division Multiplexed Fiber Bragg Grating Sensor System," *IEEE Photonics Technology Letters*, vol. 13, No. 7, Jul. 2001, 2001 IEEE, p. 702.

* cited by examiner

*Primary Examiner*—Akm Enayet Ullah
*Assistant Examiner*—Jennifer Doan
(74) *Attorney, Agent, or Firm*—Troxell Law Office PLLC

(57) ABSTRACT

The present invention provides a fiber Bragg grating system, which employs a linear-cavity fiber laser scheme to develop a high resolution sensor system. The fiber Bragg grating sensor device is located in one end for fiber laser reflecting, and in the other end is a fiber loop mirror. It forms a linear-cavity fiber laser scheme basis. The end for laser output parallel connecting with two fiber Bragg grating filters. Because of the spectrum shift of the fiber Bragg grating sensor when temperature changed, it may detect the optic power reflectivity for the variation of the temperature. Furthermore, it can resolve the temperature up to $10^{-4\circ}$ C. theoretically and can be applied for strain and temperature sensing with high precision.

16 Claims, 5 Drawing Sheets

FIBER BRAGG GRATING SENSOR SYSTEM

REFERENCE CITED

[1] U.S. Pat. No. : 5,845,033.
[2] U.S. Pat. No. : 5,748,312.
[3] U.S. Pat. No. : 6,072,567.
[4] M. A. Putnam et al., Optical Fiber Conference 1997 (OFC 97') pp. 156~157, *"Sensor grating array demodulation using a passively mode-locked fiber sensor"*.
[5] T. Kurashima et al., Integrated Optics and Optical Fiber Communications, pp. 119~122, *"Distributed strain measurement using BOTDR improved by taking account of temperature dependence of Brillouin scattering power"*.
[6] G. A. Johnson et al., IEEE Journal of Lightwave Technology, vol. 18, No. 8, pp. 1101~1105 (2000), *"Fiber Bragg Grating Interrogation and Multiplexing with a 3×3 Coupler and a Scanning Filter"*.
[7] Y. Yu et al., IEEE Photonics Technology Letters, vol. 13, No. 7, pp. 702~704 (2001), *"Fiber-Laser-Based Wavelength-Division Multiplexed Fiber Bragg Grating Sensor System"*.

FIELD OF THE INVENTION

The present invention relates to a fiber Bragg grating system, particularly to a high-resolution fiber Bragg grating sensor system with a linear-cavity fiber laser scheme. Therefore, this invention can be employed to monitor temperature variation (such as controlling for medical engineering, civil engineering, industrial sensor, and monitoring the process of silicon wafer), strain variation (such as measuring for stratum slide and structural stress), and fiber communication network (such as monitoring for the reliability of the transmission data on network).

BACKGROUND OF THE INVENTION

Prior Arts

Lately, the fiber Bragg grating has become an important optical device in the field of fiber sensor. Its characteristic is that, when under temperature varying or strain varying, the Bragg wavelength will be varied so as to apply the optical device produced by such fiber sensor in a wider field, such as in the field of variation of strain and temperature etc. The traditional fiber Bragg grating sensor system adapts broadband light source for measuring its optical power reflectivity. In general, it uses a tunable Fabry-Peror filter to be a detection device, which may transfer the reflectivity from a frequency domain to a time domain. It can be read by the present electric technology. However, according to such system, it may be limited to develop by the Fabry-Peror filter and/or the electric technology (such as the design of circuit).

John W. Berthold et al., U.S. Pat. No. : 5,845,033, Fiber optical sensing system for monitoring restrictions in hydrocarbon production systems, which discloses a system being adapted for monitoring hydrocarbon in accordance with a fiber Bragg grating system. Thus, it can obtain a fact of commercial value of the fiber sensor, which is more useful.

Alan D. Kersey et al., U.S. Pat. No. : 5,748,312, Sensing apparatus and method for detecting strain between fiber Bragg grating sensor inscribed into an optical fiber, which discloses sensing apparatus for monitoring physical quantities of multipoint by a plurality of fiber Bragg grating serially connected, such as pressure and temperature etc. Thus, it can obtain another fact of commercial value of fiber sensor for sensing in a greater area.

Michael A. Sapack et al., U.S. Pat. No. : 6,072,567, Vertical seismic profiling system having vertical seismic profiling optical signal processing equipment and fiber Bragg grating optical sensors, which discloses a seismic profiling system designed in accordance with fiber Bragg gratings. For those countries located in the seismic area, it can be very useful for seismic prediction.

M. A. Putnam et at., in "Optical Fiber Conference 1997 (OFC 97')", has provided an article of "Sensor grating array demodulation using a passively mode-locked fiber sensor", which discloses a circle structure of fiber laser formed by a plurality of fiber Bragg grating serially being connected. However, in this article, the structure is complex, and it costs high.

T. Kurashima et al., in "Integrated Optics and Optical Fiber Communications", has provided an article of "Distributed strain measurement using BOTDR improved by taking account of temperature dependence of Brillouin scattering power", which discloses a Brillouin scattering technology for distributed fiber sensor for strain and temperature. However, this kind of technology costs very high, and is limited to be suitable for civil infrastructure in long distance, such as high speed rail, bridges, and tunnels etc.

G. A. Johnson et al., in "IEEE Journal of Lightwave Technology", vol. 18, No. 8, pp. 1101~1105 (2000), has provided an article of *"Fiber Bragg Grating Interrogation and Multiplexing with a 3×3 Coupler and a Scanning Filter"*. It employs reflecting spectra of fiber Bragg grating to analyze the variation of temperature and pressure. It uses a tunable Fabry-Peror filter to be a detection device, which is very expensive (about NT$200,000). Thus, it may cost a lot for setting such structure, and it may be limited its application.

Y. Yu et al., in "IEEE Photonics Technology Letters", vol. 13, No. 7, pp. 702~704 (2001), has provided an article of *"Fiber-Laser-Based Wavelength-Division Multiplexed Fiber Bragg Grating Sensor System"*. It uses a detection device of tunable Fabry-Peror filter to be a light source, and it monitors temperature varying by using Michelson interferometer. By contrast, optic interfere technology is more difficult than fiber sensor system; therefore, cost and technology ability are the consideration for application.

Objects of this Invention

Therefore, the present invention provides a high-resolution fiber Bragg grating sensor system with a linear-cavity fiber laser scheme.

The main object of the present invention is to provide a high sensitive sensor system.

Another object of this invention is to provide a relative cheap distributed sensor system.

The other object of this invention is to provide a multi-point independent (without interfering by electromagnetism) sensor system.

SUMMARY OF THE INVENTION

The present invention provides a fiber Bragg grating sensor system, which comprises a pump laser adapted for generating light, a first coupler connecting with said pump laser, a sensor unit including a first fiber Bragg grating connected with said first coupler, a erbium-doped fiber connecting with said fist fiber Bragg grating through said first coupler, a fiber loop mirror formed by a polarization controller and a second coupler being connected to each other, a third coupler connecting with said second coupler, a forth coupler, and a fifth coupler, a second fiber Bragg grating connecting with said forth coupler, a third fiber Bragg grating connecting with said fifth coupler, a first photodetector connecting with said second fiber Bragg grating through said forth coupler, a second photodetector connecting with said third fiber Bragg grating through said fifth coupler, and a microprocessor connecting with said first photodetector and said second photodetector.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
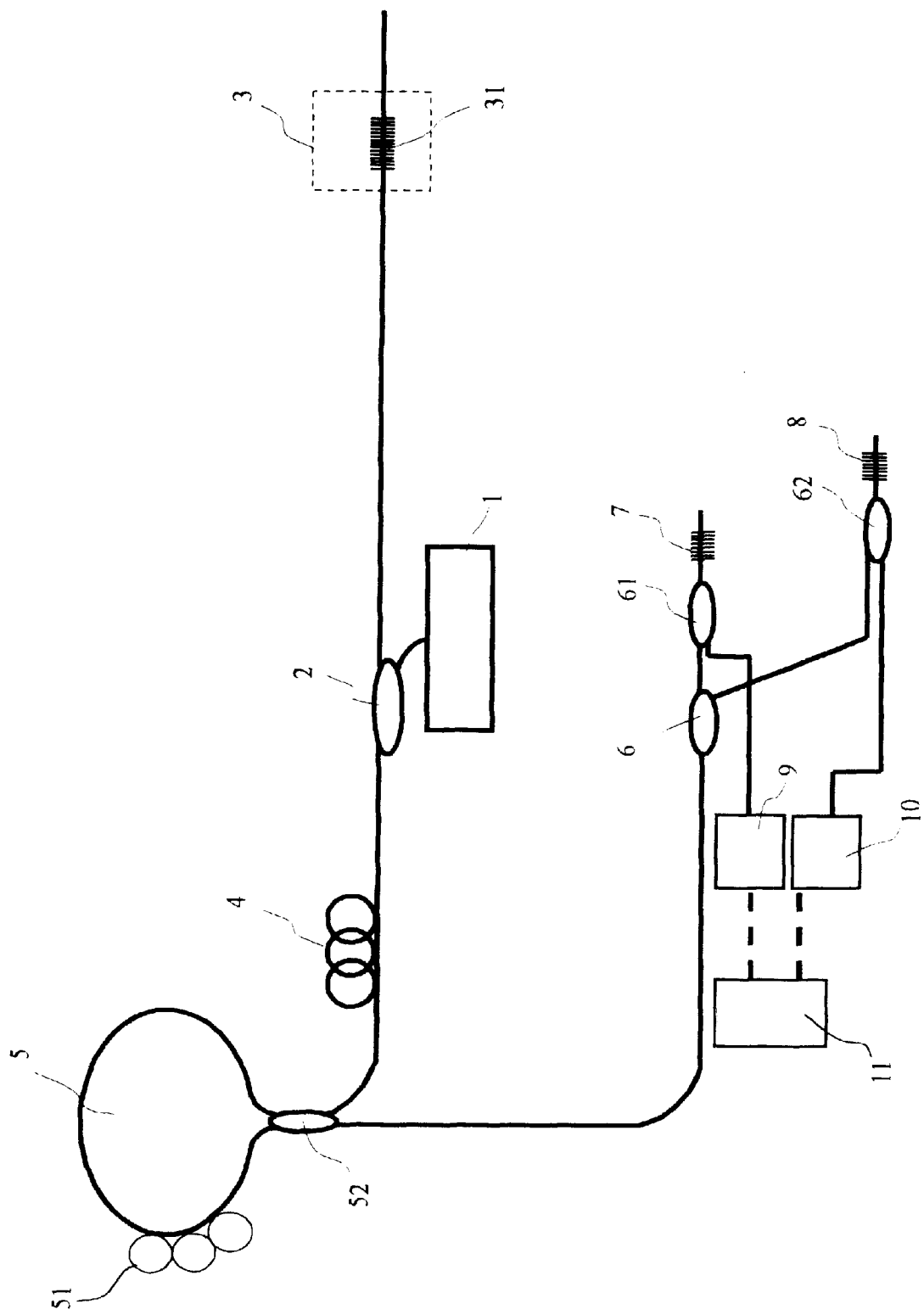
FIG. 1 illustrates a preferred embodiment of the present invention.

The present invention provides a high-resolution fiber Bragg grating sensor system with a linear-cavity fiber laser scheme. Its purpose is to provide a high accuracy of variation of temperature or strain for industry. Please refer to the FIG. 1, we discloses a fiber Bragg grating sensor system; which comprises a pump laser 1 adapted for generating light, a first coupler 2 connecting with said pump laser 1, a sensor unit 3 including a first fiber Bragg grating 31 connected with said first coupler 2, a erbium-doped fiber 4 connecting with said first fiber Bragg grating 31 through said first coupler 2, a fiber loop mirror 5 formed by a polarization controller 51 and a second coupler 52 being connected to each other, a third coupler 6 connecting with said second coupler 52, a forth coupler 61, and a fifth coupler 62, a second fiber Bragg grating 7 connecting with said forth coupler 61, a third fiber Bragg grating 8 connecting with said fifth coupler 62, a first photodetector 9 connecting with said second fiber Bragg grating 7 through said forth coupler 61, a second photodetector 10 connecting with said third fiber Bragg grating 8 through said fifth coupler 62, and a microprocessor 11 connecting with said first photodetector 9 and said second photodetector 10.

Figure 3:
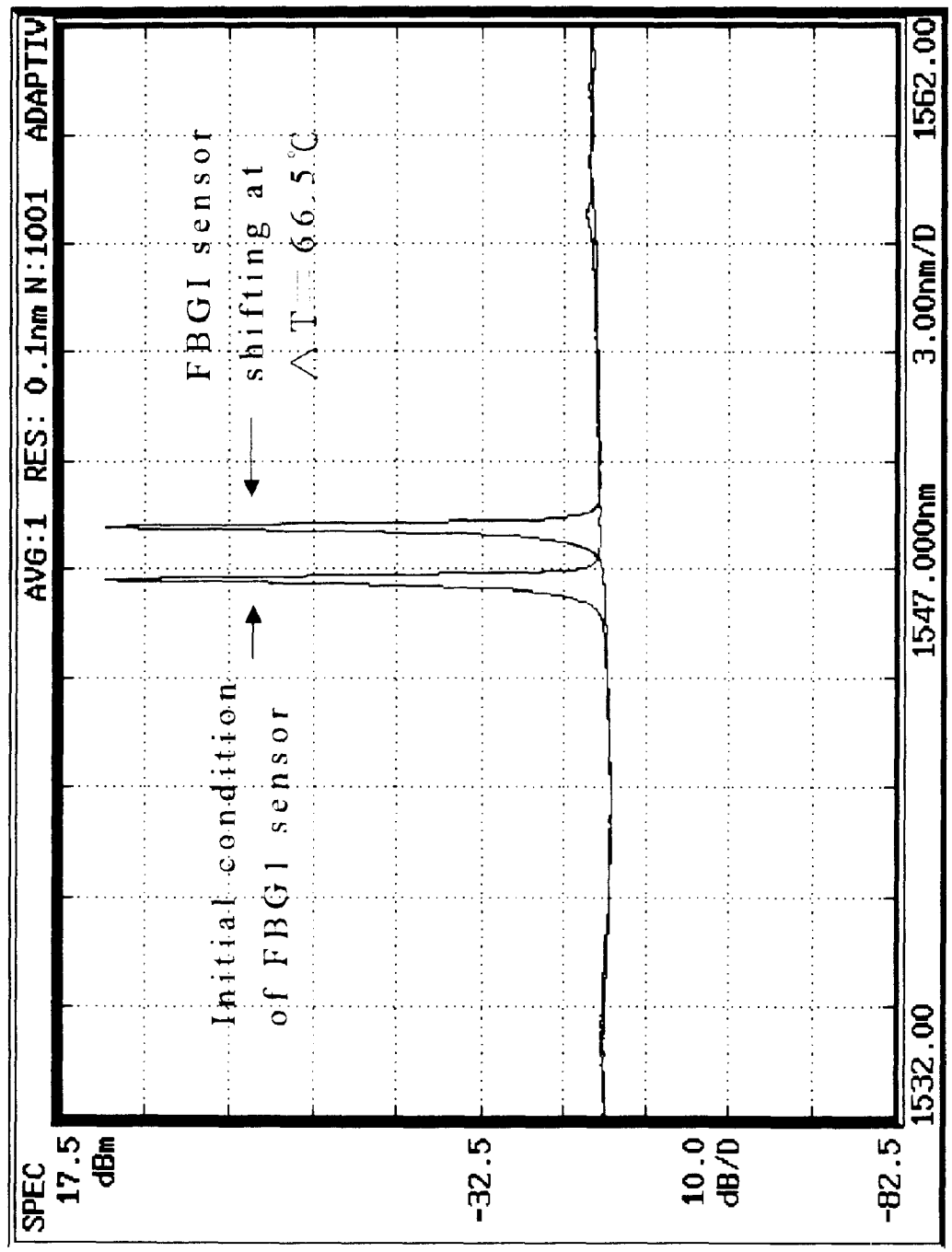
FIG. 3 illustrates the output spectra of linear-cavity fiber laser that temperature differences are at 0 and 66.5° C. in accordance with the present invention.

Furthermore, the light generated by said pumped 1 has optic power with 130 mW and wavelength with 979.52 nm (or with 1480 nm wavelength). If the fiber Bragg grating 31 of said sensor unit 3 is detected with a little variation of temperature or strain, the laser light pumped by said erbium-doped fiber 4 enters said third coupler 6 through said fiber loop mirror 5 (its output spectra being shown as the FIG. 3); wherein said fiber loop mirror 5 is formed by said polarization controller 51 and said second coupler 52 (the splitting ratio is 30:70), said second coupler 52 is a 2×2 coupler, and said third coupler 6 is a 1×2 coupler. Said third coupler 6 connects with said forth coupler 61 and said fifth coupler 62. Therefore, the laser light reaches said second fiber Bragg grating 7 and said third fiber Bragg grating 8 through said third coupler 6. Both said forth coupler 61 and said fifth coupler 62 are 1×2 couplers (the splitting ratio is 50:50). At last, said first photodetector 9 and photodetector 10 are adapted for detecting the optical power reflectivity of said second fiber Bragg grating 7 and said third fiber Bragg grating 8 respectively, which may be read and determined by said microprocessor 11.

Figure 2:
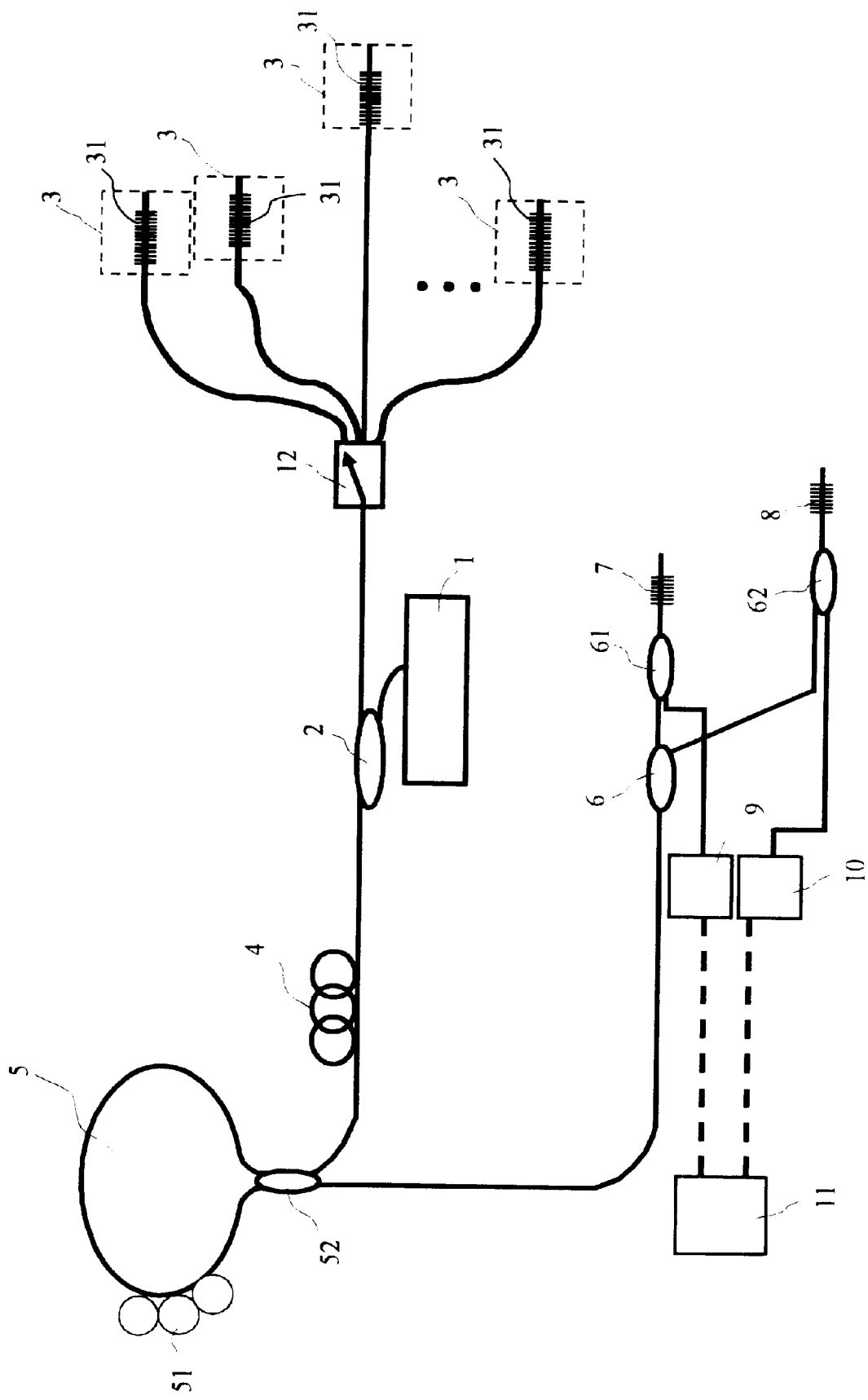
FIG. 2 illustrates another preferred embodiment of the present invention.

Except the aforementioned high-resolution fiber Bragg grating sensor system with one single measuring point, the present invention also provides a multipoint fiber Bragg grating sensor system. Please referring to the FIG. 2, the fiber Bragg grating system comprises a pump laser 1 adapted for generating light, a first coupler 2 connecting with said pump laser 1, at least a sensor unit 3, each said sensor unit 3 including a first fiber Bragg grating 31 respectively connected with said first coupler 2 through a electro-optical switch 12, a erbium-doped fiber 4 connecting with said fist fiber Bragg grating 31 through said first coupler 2, a fiber loop mirror 5 formed by a polarization controller 51 and a second coupler 52 being connected to each other, a third coupler 6 connecting with said second coupler 52, a forth coupler 61, and a fifth coupler 62, a second fiber Bragg grating 7 connecting with said forth coupler 61, a third fiber Bragg grating 8 connecting with said fifth coupler 62, a first photodetector 9 connecting with said second fiber Bragg grating 7 through said forth coupler 61, a second photodetector 10 connecting with said third fiber Bragg grating 8 through said fifth coupler 62, and a microprocessor 11 connecting with said first photodetector 9 and said second photodetector 10.

Similarly, for example, the light generated by said pumped 1 has power with 130 mW and wavelength with 979.52 nm (or with 1480 nm wavelength). A 1×N electro-optical switch 12 is employed for measuring in multipoint with time-sharing multiplexing (wherein "N" equals to the quantity of the sensor unit). When the fiber Bragg grating 31 of said sensor unit 3 is detected with a little variation of temperature or strain, the laser light pumped by said erbium-doped fiber 4 enters said third coupler 6 through said fiber loop mirror 5 (its output spectra being shown as the FIG. 3); wherein said fiber loop mirror 5 is formed by said polarization controller 51 and said second coupler 52 (the splitting ratio is 30:70), said second coupler 52 is a 2×2 coupler, and said third coupler 6 is a 1×2 coupler. Said third coupler 6 connects with said forth coupler 61 and said fifth coupler 62. Therefore, the laser light reaches said second fiber Bragg grating 7 and said third fiber Bragg grating 8 through said third coupler 6. Both said forth coupler 61 and said fifth coupler 62 are 1×2 couplers (the splitting ratio is 50:50). At last, said first photodetector 9 and photodetector 10 are adapted for detecting the optical power reflectivity of said second fiber Bragg grating 7 and said third fiber Bragg grating 8 respectively, which may be read and determined by said microprocessor 11.

Figure 4:
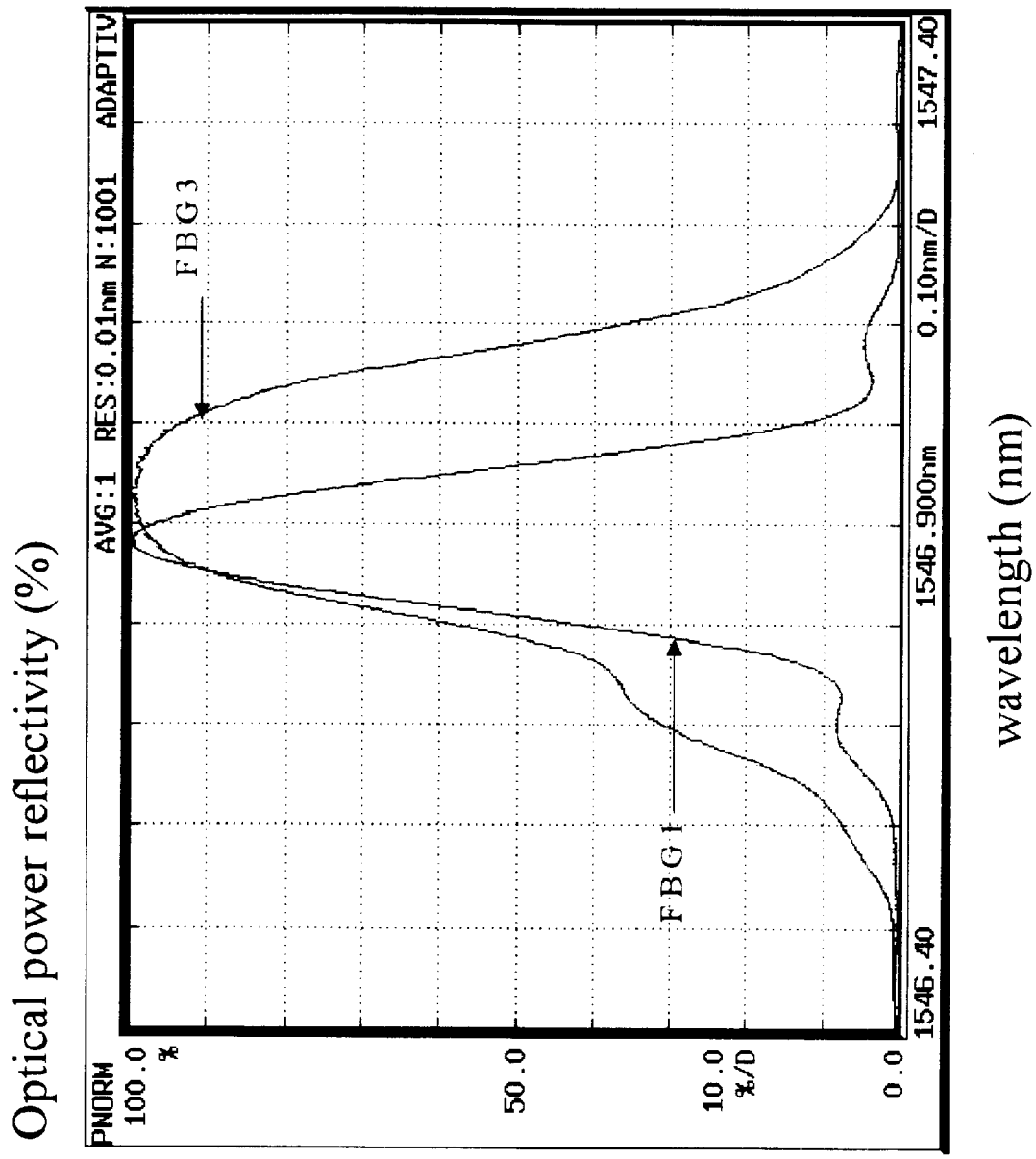
FIG. 4 illustrates the diagram of normalized optical power reflectivity versus wavelength in accordance with the present invention.
Figure 5:
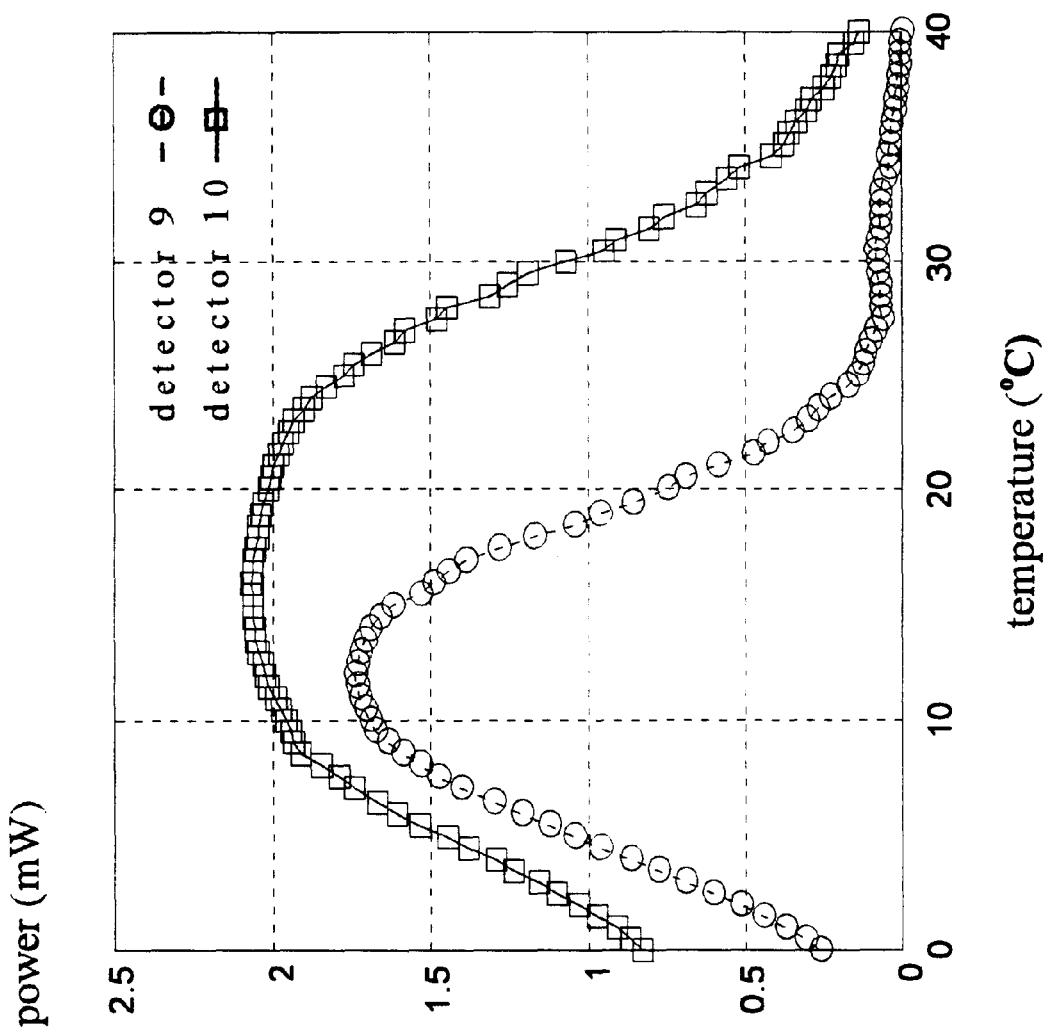
FIG. 5 illustrated the diagram of power versus temperature in accordance with the present invention.

Referring to the FIG. 4, it illustrates the diagram of normalized optical power reflectivity versus wavelength in accordance with the second fiber Bragg grating 7 and the third fiber Bragg grating 8, and their spectra are 1546.88 nm and 1546.94 nm respectively. Since their reflective spectra are not linearity, in this preferred embodiment example, the reflective spectrum of the second fiber Bragg grating 7 is used for monitoring the temperature variation between 0~25° C., and the reflective spectrum of the third fiber Bragg grating 8 is used for monitoring the temperature variation between 0~25° C. It may increase the scale of temperature measuring. Besides, due to the different optical power reflectivity of the fiber Bragg grating 7 and the fiber Bragg grating 8, it also may be adapted for monitoring temperature instantly. FIG. 5 illustrated the diagram of power versus temperature in accordance with the present invention, which is using an ILX Lightwave OMM-6810B photodetector (the minimal detection is $10^{-5}$ mW ). It is limited by the controlling for the temperature, thus, the photodetectors 9 and 10 will detect in every 0.5° C. It may be figured out that the temperature resolution reaches $8.62 \times 10^{-4}$° C. Because the power of the laser light of the fiber grating is determined by the power of the pump laser 1, it may increase the signal-to-noise ratio (SNR) by raising the power of the pump laser 1, and it further increases the resolution of the whole system.

The fiber Bragg grating system provided by this invention uses general fiber couplers and fiber Bragg gratings to develop a linear-cavity fiber laser scheme. Therefore, the present invention is a reasonable perfection invention with features of high output optic power, high SNR, and high resolution.

In general, the traditional fiber Bragg grating sensor system adapts a tunable Fabry-Perot filter to be a detection device, which may transfer the reflectivity from a frequency domain to a time domain. It can be read by the present electric technology. However, according to such system, it may be limited to develop by the Fabry-Peror filter and/or the electric technology (such as the design of circuit). The present invention takes advantages of fiber laser scheme for high resolution and high output optic power. It also takes the advantage of fiber Bragg grating having different optical power reflectivity to monitor its variation. Thus, it may increase the resolution of the sensor signal, and it also may detect the signal instantly, which does not only possess a better practicality, neither only a conception based on familiarity of utilization, it is non-obviousness.

Moreover, this invention may be widely applied for physics parameters with high precision for a long term. Further, it may have a long distance for measuring and monitoring temperature system, which is useful.

In summation of the foregoing section, the invention herein fully complies will all new patent application requirement and is hereby submitted to the patent bureau for review and the granting of the commensurate patent rights.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A fiber Bragg grating sensor system, which comprises:
   a pump laser adapted for generating light;
   a first coupler connecting with said pump laser;
   a sensor unit including a first fiber Bragg grating connected with said first coupler;
   a erbium-doped fiber connecting with said fist fiber Bragg grating through said first coupler;
   a fiber loop mirror formed by a polarization controller and a second coupler being connected to each other;
   a third coupler connecting with said second coupler, a forth coupler, and a fifth coupler;
   a second fiber Bragg grating connecting with said forth coupler;
   a third fiber Bragg grating connecting with said fifth coupler;
   a first photodetector connecting with said second fiber Bragg grating through said forth coupler;
   a second photodetector connecting with said third fiber Bragg grating through said fifth coupler; and
   a microprocessor connecting with said first photodetector and said second photodetector.

2. The sensor system of claim 1, wherein said first coupler substantially is a wavelength-division multiplexing coupler.

3. The sensor system of claim 1, wherein said second coupler substantially is a 2×2 optic coupler.

4. The sensor system of claim 1, wherein said third coupler substantially is a 1×2 optic coupler.

5. The sensor system of claim 1, wherein said forth coupler substantially is a 1×2 optic coupler.

6. The sensor system of claim 1, wherein said fifth coupler substantially is a 1×2 optic coupler.

7. The sensor system of claim 1, wherein the light generated by said pump laser has a specific optic wavelength equal to 980 nm.

8. The sensor system of claim 1, wherein the light generated by said pump laser has a specific optic wavelength equal to 1480 nm.

9. A fiber Bragg grating sensor system, which comprises:
   a pump laser adapted for generating light;
   a first coupler connecting with said pump laser;
   at least a sensor unit, each said sensor unit including a first fiber Bragg grating respectively connected with said first coupler through a electro-optical switch;
   a erbium-doped fiber connecting with said fist fiber Bragg grating through said first coupler;
   a fiber loop mirror formed by a polarization controller and a second coupler being connected to each other;
   a third coupler connecting with said second coupler, a forth coupler, and a fifth coupler;
   a second fiber Bragg grating connecting with said forth coupler;
   a third fiber Bragg grating connecting with said fifth coupler;
   a first photodetector connecting with said second fiber Bragg grating through said forth coupler;
   a second photodetector connecting with said third fiber Bragg grating through said fifth coupler; and
   a microprocessor connecting with said first photodetector and said second photodetector.

10. The sensor system of claim 9, wherein said first coupler substantially is a wavelength-division multiplexing coupler.

11. The sensor system of claim 9, wherein said second coupler substantially is a 2×2 optic coupler.

12. The sensor system of claim 9, wherein said third coupler substantially is a 1×2 optic coupler.

13. The sensor system of claim 9, wherein said forth coupler substantially is a 1×2 optic coupler.

14. The sensor system of claim 9, wherein said fifth coupler substantially is a 1×2 optic coupler.

15. The sensor system of claim 9, wherein the light generated by said pump laser has a specific optic wavelength equal to 980 nm.

16. The sensor system of claim 9, wherein the light generated by said pump laser has a specific optic wavelength equal to 1480 nm.

* * * * *